(12) United States Patent
Winowiski et al.

(10) Patent No.: US 11,286,439 B2
(45) Date of Patent: Mar. 29, 2022

(54) ANTI-AUTOOXIDATIVE WOOD PELLET BINDER

(71) Applicant: BORREGAARD AS, Sarpsborg (NO)

(72) Inventors: Thomas S. Winowiski, Mosinee, WI (US); Jerry D. Gargulak, Ringle, WI (US); Kevin L. Hendricks, Keota, IA (US); Robert H. Narron, Weston, WI (US)

(73) Assignee: BORREGAARD AS, Sarpsborg (NO)

( * ) Notice: Subject to any disclaimer, the term of this patent is extended or adjusted under 35 U.S.C. 154(b) by 0 days.

(21) Appl. No.: 15/733,827

(22) PCT Filed: May 30, 2019

(86) PCT No.: PCT/IB2019/000622
§ 371 (c)(1),
(2) Date: Nov. 30, 2020

(87) PCT Pub. No.: WO2019/229526
PCT Pub. Date: Dec. 5, 2019

(65) Prior Publication Data
US 2021/0214630 A1 Jul. 15, 2021

Related U.S. Application Data

(60) Provisional application No. 62/677,835, filed on May 30, 2018.

(51) Int. Cl.
*C10L 5/14* (2006.01)
*C10L 5/36* (2006.01)
*C10L 5/44* (2006.01)

(52) U.S. Cl.
CPC .............. *C10L 5/143* (2013.01); *C10L 5/363* (2013.01); *C10L 5/442* (2013.01); *C10L 2290/18* (2013.01)

(58) Field of Classification Search
CPC .......... C10L 5/143; C10L 5/442; C10L 5/363; C10L 2290/18
See application file for complete search history.

(56) References Cited

U.S. PATENT DOCUMENTS

| 4,308,033 A | 12/1981 | Gunnerman |
| 4,612,017 A | 9/1986 | Lindell |
(Continued)

FOREIGN PATENT DOCUMENTS

| EP | 3205707 | 8/2017 |
| KR | 101733224 | 5/2017 |
| WO | WO2014014910 | 1/2014 |

OTHER PUBLICATIONS

International Search Report and Written Opinion for PCT/IB2019/000622 dated Nov. 18, 2019.
(Continued)

*Primary Examiner* — Cephia D Toomer
(74) *Attorney, Agent, or Firm* — Patterson Thuente Pedersen, P.A.

(57) ABSTRACT

Formulations and methods of making wood pellets treated with lignin sulfonate as an anti-autooxidative component to reduce the rate of self-heating of bulk wood pellets. The lignin sulfonate may be used as a binder in the wood pellets or the wood pellets may be sprayed with lignin sulfonate for an encapsulated wood pellet. Wood pellets having the lignin sulfonate have a lowered potential of self-heating below high reactivity pellets and better structural durability during storage and transportation without adversely affecting the fuel value of the wood pellets.

76 Claims, 3 Drawing Sheets

(56) References Cited

U.S. PATENT DOCUMENTS

| | | |
|---|---|---|
| 7,960,325 B2 | 6/2011 | Kluko |
| 2009/0205546 A1 | 8/2009 | Kluko |
| 2014/0242867 A1* | 8/2014 | Jansen ............... C08H 6/00 442/181 |
| 2015/0203774 A1 | 7/2015 | Lake |

OTHER PUBLICATIONS

Mediavilla, I. et al., "Optimisation of Pelletisation Conditions for Popular Energy Crop", vol. 104, May 15, 2012. (Abstract).

Ahn Byoung Jun et al., "Effect of Binders on the Durability of Wood Pellets Fabricated from Larix Kaemferi C and Liriodendron Tulipifera L. Sawdust". vol. 62. Jul. 16, 2013. (Abstract).

Rosenblum F. et al., "Reducing the Self-heating of Sulphides by Chemical Treatment with Lignosulfonates", Elsevier. Minerals Engineering (2016).

Koshutin et al., "Grass meal carotene stabilizer—is weak soln. of lignin" Accession No. 84-145440/23. p. 18. Published Sep. 23, 1983.

Fatehi, Pedram et al., "Extraction of Technical Lignins from Pulping Spent Liquors, Challenges and Opportunities". Chapter 2. Springer Science + Business Media (2016).

Kuokkanen Matti et al., "Additives in Wood Pellet Production—A Pilot-Scale Study of Binding Agent Usage", BioResources 6(4), 4331-4355, (2011).

\* cited by examiner

ANTI-AUTOOXIDATIVE WOOD PELLET BINDER

CROSS-REFERENCE TO RELATED APPLICATION

The present application is a National Phase entry of PCT Application No. PCT/IB2009/000622, filed May 30, 2019 which claims priority to U.S. Provisional Patent Application No. 62/677,835, filed May 30, 2018, each of which is hereby fully incorporated herein by reference.

TECHNICAL FIELD

The present invention generally relates to reducing the rate of self-heating of bulk wood pellets by treatment with a lignin anti-autooxidative component, wood pellet compositions, and methods of making and using wood pellets having the lignin anti-autooxidative component, particularly for transporting and storage of bulk wood pellets.

BACKGROUND

The use of renewable biomass fuels has increased with the transition from fossil fuels to various types of biofuels, which has led to much more extensive handling and larger stockpiles of biomass fuels. One such biomass fuel is biomass pellets, which are a refined fuel with low moisture content, high energy density and homogenous size and shape. Biomass pellets are normally produced by milling wood chips, bark, sawdust, planer shavings and the like into a fine powder, which is compressed into pellets. Raw materials derived from biomass other than wood can also be used in biomass pellets.

One type of biomass pellet is wood pellets. Wood pellets are normally made from softwood or hardwood trees, which are logged, debarked, chipped, dried, conditioned, pelletized, and screened to remove fines. Wood pellets are normally held together simply as a function of pressure and the lignin and other naturally occurring components acting as a binder and also exuding to the surface to form a waxy-like or plastic-like surface on the resulting pellets. Typically, wood pellets have a diameter of at least 6-8 mm up to 1.5 inches and a length not exceeding 40 mm. The moisture content is usually between 6-10% and the gross calorific value around 20 MJ/kg (or the net calorific value at constant pressure above 16.5 MJ/kg).

One long time, well-known problem with biomass pellets, including wood pellets, is rapid self-heating leading to spontaneous combustion. This can be caused by chemical oxidation and physical transition reactions (e.g., water sorption). Wood pellets also tend to break up every time they are handled, producing a dust that presents a significant fire and explosion risk, as well as breaking down the structural integrity of the wood pellet. The more times pellets are handled, the more the wood pellets break up causing fiber loss and dust production.

Biomass pellets are normally hygroscopic and may absorb moisture from the surroundings. To protect the pellets from atmospheric moisture and maintain their physical structure, biomass pellets including wood pellets are normally stored in large piles in huge storage buildings after production, or in silos which can be very large in size. When transferred from one location to another, various modes of transporting large amounts of biomass pellets can be utilized, including cargo ships for overseas and trucks or trains for overland distances. During transportation, the biomass pellets are also usually stored in bulk containers to maintain the low moisture content and the structure of the fuel.

Chemical oxidation is the main contributor to self-heating in stored wood pellets and also in some non-pelletized materials, such as wood chips or terrified biomass. The oxidation reactions take place on the surface of the material and exothermic heat is produced when unsaturated fatty acids or resin acids in the biomass oxidize. The oxidation process also leads to depletion of oxygen, as well as formation of carbon dioxide and carbon monoxide, which is a potential hazard of poisonous gas to exposed people. The auto-oxidation process can be controlled by removing access to oxygen, such as by sealing a silo and purging with an inert gas, such as nitrogen gas. Controlling access to oxygen during storage or transportation, however, is not always practical or possible.

The increased production volumes of biomass pellets, including wood pellets, transportation, handling, and storage of pellets have resulted in increased risks, including the risk of spontaneous ignition due to rapid self-heating of the biomass pellets. Self-heating of pellets in bulk containment often results in elevated temperatures in the range of 30° C. to 50° C., or even higher. If the rate of self-heating is sufficient, fire can result. Generally, larger stocks correspond to larger risks, as the heat conduction in the material is low.

Therefore, there is a need in the industry for biomass pellets that are not as susceptible to self-heating to minimize or eliminate the risks associated with large stock piles of biomass pellets, including wood pellets. There is also a need to provide biomass pellets that are not as susceptible to moisture migration and structural depletion. There is further a need to provide biomass pellets that maintain durability during normal modes of transportation and storage while minimizing self-heating and other potential hazardous situations.

SUMMARY

The present invention is directed to a method for manufacturing a fuel pellet having at least one lignin component additive added to the fibrous wood material to reduce the rate of self-heating reactivity of the fuel pellet. In some aspects, the lignin component is lignin sulfonate. In some aspects, the lignin component is non-sulfonated lignin. In some other aspects, the lignin component is mixture of lignin sulfonate and a non-sulfonated lignin.

In some aspects, the at least one lignin component additive is combined with a fibrous wood material, such as in a conditioner, to form a mixture prior to the mixture being extruded under pressure through a pellet press to form a plurality of wood pellets. In some aspects, the at least one lignin component additive is added to the fuel pellet after a source of fibrous wood material has been extruded under pressure through a pellet press to form a plurality of wood pellets, such as by spraying the at least one lignin component onto the wood pellets as the wood pellets exit the pellet press. In some aspects, the lignin component additive is added to the source of fibrous wood material prior to the pellet press and the same lignin component or another lignin component additive is added after the wood pellets are formed, such as by spraying the lignin component onto the wood pellets comprising fibrous wood material and at least one lignin component as the wood pellets exit the pellet press.

In some aspects, the lignin component comprises a lignin sulfonate. The source of lignin sulfonate can be one or more lignosulfonate salts, including calcium lignosulfonate, magnesium lignosulfonate, ammonium lignosulfonate and sodium lignosulfonate. The lignin sulfonate is preferably present in the wood pellets in an amount of about 0.5 wt-% to about 5 wt-% based on a dry basis of the source of the lignin sulfonate.

In some aspects, the lignin component comprises a non-sulfonated lignin. The source of non-sulfonated lignin can be one or more of softwood kraft lignin, hardwood kraft lignin, pyrylysis lignin, or combinations thereof. The non-sulfonated lignin is preferably present in the wood pellets in an amount of about 0.5 wt-% to about 5 wt-% based on a dry basis of the source of the non-sulfonated lignin.

The fuel pellets having the lignin component have a reduced rate of self-heating potential as compared to fuel pellets made from the same fibrous wood material without the addition of the lignin component. In some aspects, the addition of a sulfonated lignin component to the fuel pellets effectively lowers the potential reactivity of the wood pellets such that the fuel pellets have an average maximum heat release rate below about 0.85 mW/g, preferably below about 0.80 mW/g, preferably below about 0.75 mW/g, preferably below about 0.70 mW/g, preferably below about 0.65 mW/g, and even more preferably below about 0.60 mW/g, as compared to fuel pellets from the same organic fibrous wood material without the addition of the lignin component having an average maximum specific heat release rate greater than about 0.80 mW/g.

In some aspects of the present invention, the lignin component is at least one non-sulfonated lignin component added to a organic fibrous hardwood material in an amount to effectively lower the potential reactivity of the wood pellets such that bulk wood pellets have an average maximum heat release rate below about 2.0 mW/g, preferably below about 1.95 mW/g, preferably below about 1.9 mW/g, preferably below about 1.85 mW/g, in some aspects preferably below about 1.8 mW/g, and in some other aspects preferably below about 1.75 mW/g, as compared to fuel pellets from the same organic fibrous hardwood material without a non-sulfonated lignin component having an average maximum specific heat release rate greater than about 2.0 mW/g.

In some aspects of the present invention, the lignin component is at least one non-sulfonated lignin component added to a organic fibrous softwood material in an amount to effectively lower the potential reactivity of the wood pellets such that bulk wood pellets have an average maximum heat release rate below about 0.75 mW/g, preferably below about 0.74 mW/g, preferably below about 0.73 mW/g, preferably below about 0.72 mW/g, preferably below about 0.71 mW/g, preferably below about 0.70 mW/g, in some aspects preferably below about 0.65 mW/g, and in some other aspects preferably below about 0.60 mW/g, as compared to fuel pellets from the same organic fibrous hardwood material without a non-sulfonated lignin component having an average maximum specific heat release rate greater than about 0.75 mW/g.

In some aspects of the present invention, the lignin component provides a reduced rate of self-heating potential for the fuel pellets as compared to fuel pellets made from the same fibrous wood material without the addition of the lignin component. In some aspects, the addition of at least 0.5 wt-% up to about 5 wt-% of the lignin component to the fuel pellets, based on a dry basis of the source of the lignin component, effectively lowers the potential reactivity of the wood pellets by at least 10%, in some aspects at least 15%, in some aspects at least 20%, in some aspects at least 25%, in some aspects at least 30%, in some aspects at least 35%, and in some aspects at least 40%, as compared to fuel pellets from the same organic fibrous wood material without the addition of the lignin component.

The above summary is not intended to describe each illustrated embodiment or every implementation of the subject matter hereof The figures and the detailed description that follow more particularly exemplify various embodiments.

DETAILED DESCRIPTION

Figure 1:
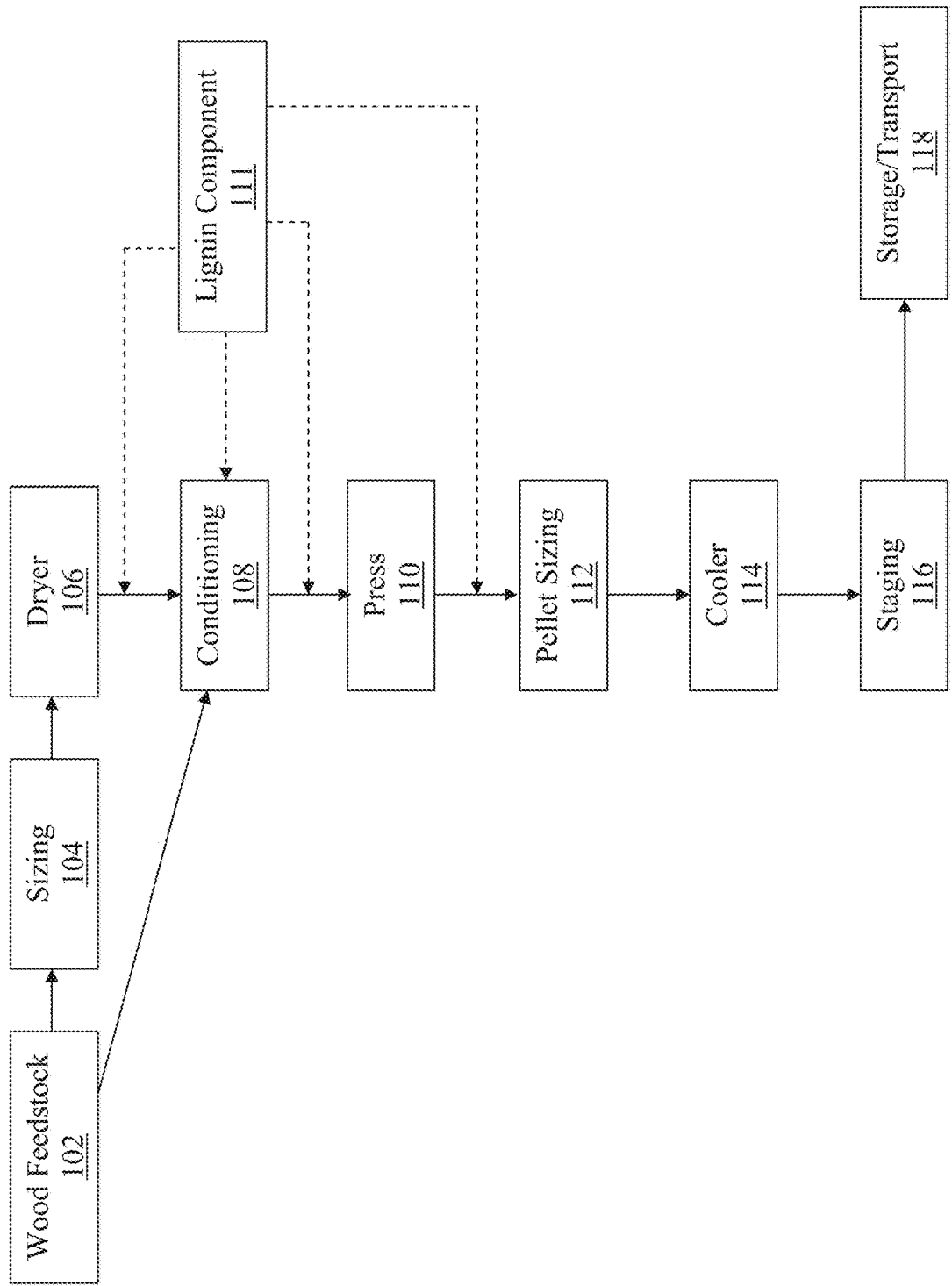
FIG. 1 shows a schematic illustration of an exemplary embodiment of a system for treating wood pellets with the addition of a lignin component according to certain aspects of the present invention.

The term "about" refers to a range of numbers that is considered equivalent to the recited value (e.g., having the same function or result). In many instances, the term "about" may include numbers that are rounded to the nearest significant figure.

The term "bulk" in the context of wood pellets as used herein refers to wood pellets in an amount of at least 1 metric ton (2,240 pounds avoirdupois; 1016.05 kg).

Numerical ranges expressed using endpoints include all numbers subsumed within that range (e.g. 1 to 5 includes 1, 1.5, 2, 2.75, 3, 3.80, 4 and 5).

The term "lignin sulfonate" used herein refers to one or more water-soluble anionic polyelectrolyte polymers that are the byproducts from the production of wood pulp using sulfite pulping, including, but not limited to, lignosulfonic acid (CAS No. 8062-15-5), lignosulfonate salts, including calcium lignosulfonate (CAS No. 8062-52-7), magnesium lignosulfonate (CAS No. 8061-54-9), ammonium lignosulfonate (CAS No. 8061-53-8), sodium lignosulfonate (CAS No. 8061-51-6), and combinations and mixtures thereof.

The term "softwood Kraft lignin" used herein refers to a lignin material obtained from the precipitation of Kraft Black Liquor that is derived from the Kraft process of a softwood source, which is known to one of ordinary skill to involve acidification of the black liquor, followed by precipitation, filtration and drying, which results in the lignin material having a weight average molecular weight (Mw) between about 6000 and about 25,000, number average molecular weight (Mn) between about 600 and about 1200, total sulfur content between about 1 and about 5% (2.5) wt/wt, Ash of about 1.5 to about 6.0%, phenolic OH content between about 3.0 and about 8.0% wt/wt, and carbonyl content between about 0.1 and about 2.0% wt/wt.

The term "hardwood Kraft lignin" used herein refers to a lignin material obtained from the precipitation of Kraft Black Liquor that is derived from the Kraft process of a hardwood source, which is known to one of ordinary skill to involve acidification of the black liquor, followed by precipitation, filtration and drying, which results in the lignin material having a weight average molecular weight (Mw)

between about 4000 and about 18,000, number average molecular weight (Mn) between about 400 and about 1000, total sulfur content between about 1 and about 4.5% wt/wt, Ash of about 1.0 to about 5.5%, phenolic OH content between about 3.0 and about 8.0% wt/wt, and carbonyl content between about 0.1 and about 2.0% wt/wt.

The term "pyrolysis lignin" used herein refers to a lignin material obtained by the pyrolysis of a wood source, followed by recovery of the lignin faction using a fractionation process, which results in the lignin material having a weight average molecular weight (Mw) between about 1600 and about 4000, number average molecular weight (Mn) between about 400 and about 2000, total sulfur content of less than about 0.1% wt/wt, Ash of less than about 0.05%, phenolic OH content between about 4.0 and about 8.0% wt/wt, and carbonyl content between about 0.0 and 0.5% wt/wt.

The term "purified pyrolysis lignin" used herein refers to a pyrolysis lignin having a portion of the anhydrous sugars removed to provide a lignin material having a glass state at ambient temperatures, which may be removed by a liquid extraction technique by dissolving 980 grams of pyrolysis lignin in 1.0 liter of 1-butanol heated to about 50° C. and extracting the solution thrice with 2.0 liters of water, followed by evaporating the water-saturated 1-butanol to dryness under reduced pressure on a rotary evaporator (bath temperature at 68° C.) to recover the purified pyrolysis lignin.

All percentages are weight percentages.

Wood pellets of the present invention effectively reduce the rate of self-heating of wood pellets and maintain the durability of wood pellets during bulk wood pellet transport and bulk wood pellet storage by adding a lignin component additive to the organic fibrous wood material. Wood pellets of the present invention have an organic fibrous wood material shaped by a pellet mill. The wood pellets also have at least one lignin component added to the organic fibrous material.

In some preferred aspects, the lignin component additive is added to the organic fibrous material before entering the die of the pellet mill. In some other preferred aspects, the lignin component additive is added to the wood pellet after the organic fibrous material goes through the die of the pellet mill and has the cylindrical-shaped pellet. In still other aspects, a portion of the lignin component additive is added to the organic fibrous material before entering the die of the pellet mill and another portion of the lignin component additive is added to the wood pellet after the organic fibrous material goes through the die of the pellet mill. The pressure and temperature in the die is such that lignin and other naturally contained components, such as waxy substances naturally contained in the cells of the fibrous lignocellulose material, exude to the surface and form a protective wax-like or plastic-like material taking the shape of cylindrical-shaped pellets coming from the die.

In the present invention, the wood pellets can be made from any organic fibrous wood material ground to a desired size that allows free-flow into the pellet mill which can be shaped into a pellet under pressure using a pellet mill known to one of ordinary skill in the art. The organic fibrous wood material can be from torrefied wood, whole-tree (white) wood, or combinations thereof.

Torrefied wood is wood that has been partially oxidized to drive off the water and the organic volatiles and a fraction of the cellulose, so that a "blackened" wood material, often in the form of a blackened wood chip is the result. The torrefied wood chips are friable and can be formed into a high-energy, high-density pellet. When a pellet is made from torrefied wood, most of the natural binders are burned off so that the resulting pellet has poor water repellency, and in a worst case, the pellets turn into a sludge upon exposure to water.

Suitable sources of wood material includes softwood, hardwood or combinations thereof from virgin lumber, wood residuals from sawmills and finishing plants, pulp and paper mill residuals, recovered untreated lumber, wood chips, bark, planar shavings, sawdust and other scrap and waste sources of wood or lumber.

In some aspects, the preferred wood material is a softwood feedstock. Exemplary softwood feedstocks include cedar, cypress, douglas-fir, hemlock, larch, pine, and spruce. Exemplary pine includes European black pine, jack pine, lodgepole pine, monterey pine, ponderosa pine, red pine, white pine, and southern yellow pine. In some aspects, the preferable wood material comprises southern yellow pine.

In some aspects, the preferred wood material is a hardwood feedstock. Exemplary hardwood feedstocks include alder, ash, aspen, balsa, basswood, birch, boxelder, chestnut, cherry, cottonwood, dogwood, elm, hickory, ironwood, mahogany, maple, oak, poplar, sandalwood, walnut and willow. One of ordinary skill in the art will appreciate that other softwood and hardwood feedstocks are contemplated.

The lignin component may comprise one or more lignin sulfonates, non-sulfonated lignins, or a combination or mixture thereof.

Any suitable source of lignin sulfonate may be used to treat the organic fibrous wood material. In some aspects, the lignin sulfonate is provided as a liquid. In some other aspects, the lignin sulfonate is provided as a dry material. One suitable source of lignin sulfonate is from the sulfite pulping process as a byproduct, the primary purpose of the sulfite pulping process being to liberate and recover the cellulose component. The spent sulfite liquor can be filtered to remove any undissolved cellulose. The filtered liquor can then be concentrated by evaporation to produce lignin sulfonate. Lignin sulfonate is a biopolymer with an amorphous structure, an example of which is shown in Formula I:

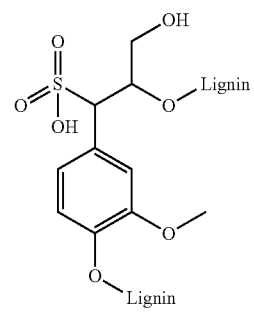

Formula I

Lignin sulfonate may also be present as one or more lignin sulfonate salts, such that the sulfonate complex may be in association with calcium (calcium lignosulfonate), magnesium (magnesium lignosulfonate), ammonium (ammonium lignosulfonate) or sodium (sodium lignosulfonate). Lignin sulfonate may have a range of molecular mass ranging from about 1000 to about 140,000 daltons. Commercial sources of lignin sulfonate may also be used, such as Amen-Bond AM 870L, available from LignoTech Florida. In certain aspects, the source of lignin sulfonate is preferably water soluble at a pH less than about 10. In certain aspects, the source of lignin sulfonate is ammonium lignosulfonate that is water soluble at a pH less than about 10.

In some aspects, the lignin component is added to the organic fibrous wood material in an amount of at least about 0.5 wt-%, at least about 0.6 wt-%, at least about 0.7 wt-%, at least about 0.8 wt-% at least about 0.9 wt-%, and in some aspects at least about 1.0 wt-% based upon the total dry weight of the lignin component and fibrous wood material. In some aspects, the lignin component is added to the organic fibrous wood material in an amount up to about 5.0 wt-%, up to about 4.0 wt-%, up to about 3.0 wt-%, and in some aspects up to about 2.0 wt-%, based upon the total dry weight of the lignin component and fibrous wood material. In some aspects, the lignin component is added to the organic fibrous wood material in an amount between about 0.5 wt-% and about 5 wt-%, preferably in an amount between about 0.6 wt-% and about 3.5 wt-%, preferably between about 0.7 wt-% and about 3.0 wt-%, preferably between about 0.8 wt-% and about 2.5 wt-%, preferably between about 0.9 wt-% and about 2.25 wt-%, and in some aspects more preferably between about 1 wt-% and about 2.0 wt-%, based upon the total dry weight of the lignin component and fibrous wood material.

In some aspects, the lignin component is one or more lignin sulfonates. In some aspects, the lignin component is softwood kraft lignin. In some aspects, the lignin component is hardwood kraft lignin. In some aspects, the lignin component is pyrolysis lignin. In some aspects, the lignin component is purified pyrolysis lignin.

In some aspects, the lignin component is chosen from one or more lignin sulfonates, softwood kraft lignin, hardwood kraft lignin, pyrolysis lignin, purified pyrolysis lignin, and combinations and mixtures thereof.

Referring now to FIG. 1, an exemplary system for treating an organic fibrous wood feedstock with a lignin component during a fuel pellet formation process is illustrated. The organic fibrous wood feedstock 102 can be treated in a sizing device 104 to comminute the feedstock 102 to a desired dimension. In some aspects, the wood feedstock 102 is comminuted to an average size less than about 5 mm. The sized wood feedstock can then be dried using a dryer 106 to moisture content below about 15 wt-%, preferably below about 12 wt-%. If the wood feedstock 102 is already sized, it can be introduced directly to the dryer 106. Similarly, if the wood feedstock 102 is already sized and dried, it can be introduced into a conditioning chamber 108. The lignin component additive 111, such as one or more lignin sulfonate salts, softwood kraft lignin, hardwood kraft lignin, pyrolysis lignin, purified pyrolysis lignin, or a combination or mixture thereof, can be added to the sized wood feedstock in the conditioning chamber 108, where the organic fibrous wood material and lignin component can be intimately mixed to provide a feed mixture. In some aspects, the lignin component can be added as a liquid solution. In certain other aspects, the lignin component can be added as a dry material. The conditioning chamber 108 can utilize a mixing blade, screw auger, or other means of mixing the organic fibrous wood material and lignin component within conditioning chamber 108. The feed mixture can optionally be thermally heated to a temperature of about 140° C. to about 150° C. prior to being fed to the pellet press 110. In some aspects, the feed mixture has a moisture content of about 6 to about 10 wt-% in the conditioning chamber 108. The feed mixture is fed from the conditioning chamber 108 to the pellet press 110 where the mixture is extruded as a cylindrical-shaped product of compressed material having a diameter of about 6 mm to about 1.5 inches, depending upon the desired diameter. The cylindrical-shaped product of compressed fuel mixture exiting the pellet press 110 can be comminuted into pieces of a desired length in a pellet sizer 112, e.g., the compressed fuel material may be chopped into substantially cylindrical pieces of conventional length, such as about 1 cm to about 4 cm in length. The fuel pellet can optionally be cooled using a blower 114 before being transferred to staging area 116 for transport and/or storage 118.

In some aspects, the lignin component additive 111 can be applied to the sized wood feedstock 102 as it is conveyed to the conditioning chamber 108. In some aspects, the lignin component additive 111 can be applied to the feedstock as it is transferred from the conditioning chamber 108 to the pellet press 110. In some other aspects, the lignin component 111 can be applied onto the outer surface of the cylindrical-shaped pellets as they exit the pellet press 110. In some other aspects, the lignin component additive 111 can be added to the fibrous wood material at one or more of the foregoing disclosed locations during the process of making the fuel pellet. For example, the lignin component additive 111 may be sprayed onto the wood feedstock prior to the conditioning chamber 108, a dry source of lignin component additive 111 may be added within the conditioning chamber 108 where it is mixed with the wood feedstock within the conditioning chamber 108, lignin component additive 111 may be sprayed onto the feed mixture as it is transferred from the conditioning chamber 108 to the pellet press 110, and lignin component additive 111 may be sprayed onto the outer surface of the cylindrical-shaped pellets as they exit the pellet press 110. In some preferred embodiments, the lignin component additive 111 is added as a liquid to the wood feedstock within the conditioning chamber 108 where the wood feedstock and lignin component are mixed to provide a feed mixture that is fed to the pellet press 110.

Figure 2:
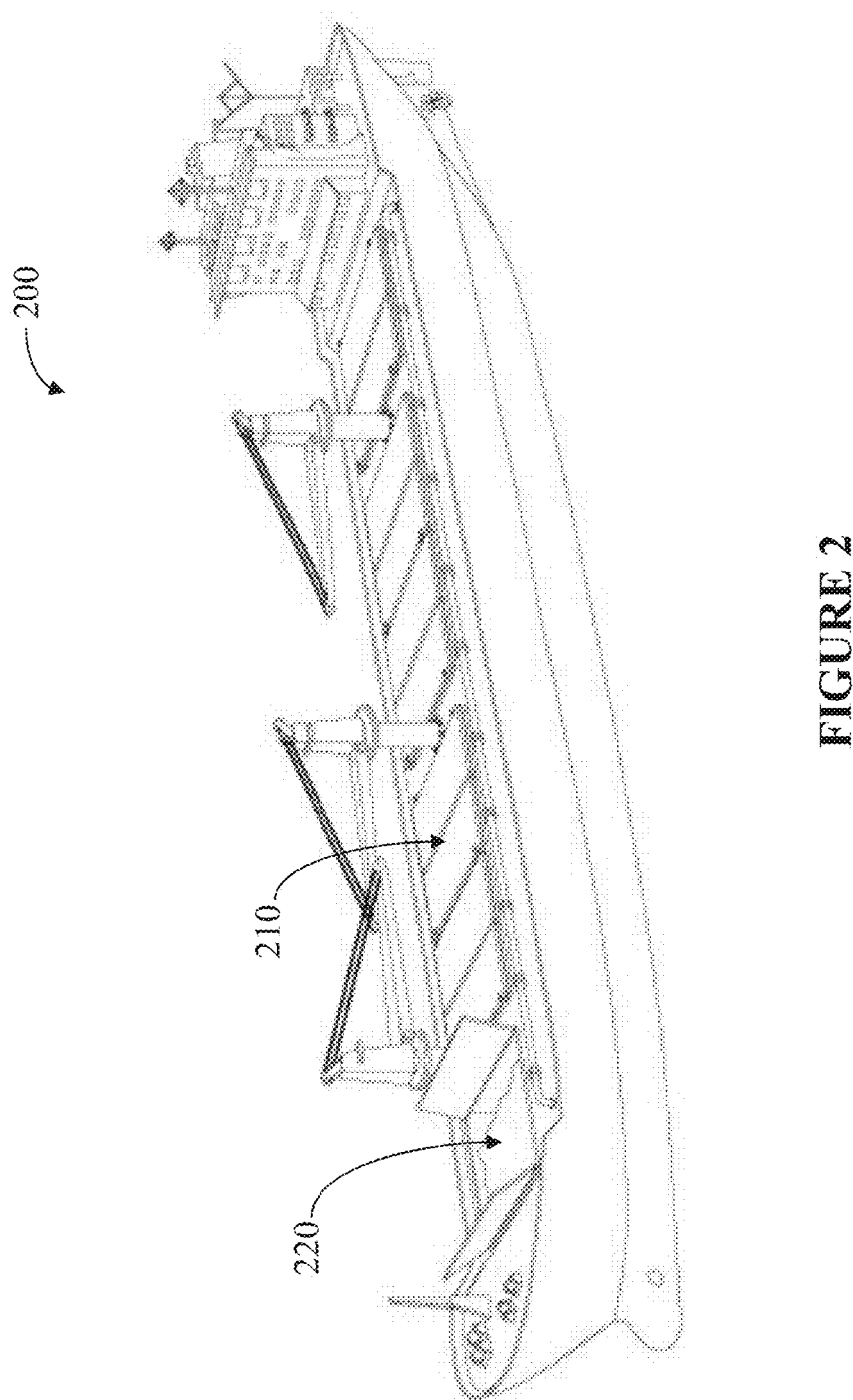
FIG. 2 shows an illustrative exemplary embodiment of the wood pellets treated with lignin sulfonate transported in bulk on a ship according to certain aspects of the present invention.

The fuel pellets of the present invention can be transported and stored in bulk while having a reduced self-heating potential. As illustrated in FIG. 2 for exemplary purposes, the fuel pellets 220 of the present invention can be stored in bulk a ship hold 210 of a cargo ship 200 during transportation with reduced risk of rapid self-heating, which may result in fire. The fuel pellets can also be transported in bulk by other modes of transportation, including barge, truck, railroad and the like. The fuel pellets can also be stored in large piles, including in buildings, silos, ship holds, and the like. In some aspects, a means of transporting fuel pellets may transport more than 5 tons of fuel pellets, preferably more than 10 tons of fuel pellets, more preferably more than 25 tons, more preferably more than 50 tons, more preferably more than 100 tons, more preferably more than 250 tons, more preferably more than 500 tons, more preferably more than 1000 tons, more preferably more than 2500 tons, more preferably more than 5000 tons, and more preferably more than 7500 tons, without the risk of self-heating.

In some aspects of the present invention, the lignin component is added to the organic fibrous wood material in an amount to effectively lower the potential reactivity of the wood pellets such that bulk wood pellets have an average maximum heat release rate below about 0.85 mW/g, preferably below about 0.80 mW/g, preferably below about 0.75 mW/g, preferably below about 0.70 mW/g, preferably below about 0.65 mW/g, and even more preferably below about 0.60 mW/g, as compared to fuel pellets from the same organic fibrous wood material without lignin component having an average maximum specific heat release rate greater than about 0.80 mW/g. Fuel pellets having an average maximum specific heat release rate greater than about 0.80 mW/g are more reactive and thus more prone to a rapid self-heating rate, and potentially the danger of fire and lost stock, especially when stored or transported in bulk.

In some aspects of the present invention, the lignin component is at least one lignin sulfonate added to the organic fibrous wood material in an amount to effectively lower the potential reactivity of the wood pellets such that bulk wood pellets have an average maximum heat release rate below about 0.85 mW/g, preferably below about 0.80 mW/g, preferably below about 0.75 mW/g, preferably below about 0.70 mW/g, preferably below about 0.65 mW/g, and even more preferably below about 0.60 mW/g, as compared to fuel pellets from the same organic fibrous wood material without lignin sulfonate having an average maximum specific heat release rate greater than about 0.80 mW/g.

In some aspects of the present invention, the lignin component is at least one non-sulfonated lignin component added to a organic fibrous hardwood material in an amount to effectively lower the potential reactivity of the wood pellets such that bulk wood pellets have an average maximum heat release rate below about 2.0 mW/g, preferably below about 1.95 mW/g, preferably below about 1.9 mW/g, preferably below about 1.85 mW/g, in some aspects preferably below about 1.8 mW/g, and in some other aspects preferably below about 1.75 mW/g, as compared to fuel pellets from the same organic fibrous hardwood material without a non-sulfonated lignin component having an average maximum specific heat release rate greater than about 2.0 mW/g.

In some aspects of the present invention, the lignin component is at least one non-sulfonated lignin component added to a organic fibrous softwood material in an amount to effectively lower the potential reactivity of the wood pellets such that bulk wood pellets have an average maximum heat release rate below about 0.75 mW/g, preferably below about 0.74 mW/g, preferably below about 0.73 mW/g, preferably below about 0.72 mW/g, preferably below about 0.71 mW/g, preferably below about 0.70 mW/g, in some aspects preferably below about 0.65 mW/g, and in some other aspects preferably below about 0.60 mW/g, as compared to fuel pellets from the same organic fibrous hardwood material without a non-sulfonated lignin component having an average maximum specific heat release rate greater than about 0.75 mW/g.

The reduced rate of self-heating potential for the fuel pellets having at least one lignin component as compared to fuel pellets made from the same fibrous wood material without the addition of the lignin component can be expressed in a percent reduction. In some aspects, the addition of at least 0.5 wt-% up to about 5 wt-% of the lignin component to the fuel pellets effectively lowers the potential reactivity of the wood pellets by at least 10%, in some aspects at least 15%, in some aspects at least 20%, in some aspects at least 25%, in some aspects at least 30%, in some aspects at least 35%, in some aspects at least 40%, in some aspects at least 45%, and in some aspects at least 50%, as compared to fuel pellets from the same organic fibrous wood material without the addition of the lignin component.

In some aspects, the addition of at least 0.5 wt-% up to about 5 wt-% of the lignin component to the fuel pellets effectively lowers the potential reactivity of the wood pellets by at least 10% up to about 50%, in some aspects at least 15% up to about 50%, and in some other aspects at least 20% up to about 45%.

In some preferable aspects, the addition of at least 0.5 wt-% up to about 3 wt-%, and in some other preferable aspects at least 1.0 wt-% up to about 2 wt-%, of the lignin component to the fuel pellets, based upon the total dry weight of the lignin component and fibrous wood material, effectively lowers the potential reactivity of the wood pellets by at least 15%, in some aspects at least 20%, in some aspects at least 25%, in some aspects at least 30%, in some aspects at least 35%, in some aspects at least 40%, in some aspects at least 45%, and in some aspects at least 50%, and in some other aspects by at least 10% up to about 50%, in some aspects at least 15% up to about 50%, and in some other aspects at least 20% up to about 45%, as compared to fuel pellets from the same organic fibrous wood material without the addition of the lignin component.

The disclosed composition is further illustrated in the following non-limiting examples. Various modifications and alterations of the disclosed compositions will be apparent to those skilled in the art without departing from the scope of this disclosure.

EXAMPLES

Example 1

Wood Fuel Pellets Containing Lignin Sulfonate

Testing was conducted to measure the effect of lignin sulfonate upon the rate of wood pellet self-heating using isothermal calorimetry. Fuel pellets were made from southern yellow pine feedstock material having a moisture content of about 7-9 wt-%. Fuel pellets were also made by adding 0.7 wt-% and 1.3 wt-% ammonium lignosulfonate (Amen-Bond AM 870 L) to the same southern yellow pine feedstock material within a conditioning chamber prior to a pellet press. The wood feedstock material and ammonium lignosulfonate were mixed within a conditioning chamber before the mixture was fed to a pellet press for fuel pellet formation.

In testing the isothermal calorimetry of the two separate sets of controls and each of the samples treated with ammonium lignosulfonate, which were each run in duplicate, an eight channel TAM Air 3116-2 isothermal calorimeter manufactured by TA Instruments, New Castle Del., USA was used. The isothermal calorimeter was used to accurately (mW-scale) measure the generated heat flow caused by the self-heating processes in the pellets. For each channel a glass test ampoule of 20 mL was used. The pellet sample (approximately 4.0 g) was placed in the ampoule, which was then sealed with a Teflon coated septum and an aluminum crimp cap. For each test sample there is also an ampoule with an inert reference that does not produce any heat (e.g., water). When lowered into the instrument, the ampoules with the sample and reference are in contact with parallel heat flow sensors, which are also in contact with a heat sink. During the test, a temperature gradient is developed across the sensors. This temperature gradient is translated into the difference in heat release rate (HRR) between the sample and the reference, i.e. the rate of the process taking place in the sample ampoule.

The TAM Air instrument was used with the software "TAM Assistant v1.3.0.150", also supplied by TA Instruments, New Castle Del., USA. The heat flow measurements for the instrument were calibrated before testing, using the calibration procedures included in the software. Before each test was started, a 30 min baseline was measured when the instrument had reached stable/balanced conditions with no heat produced. The baseline was also measured after the test had been terminated, the samples removed from the instrument, and the instrument had reached stable conditions. The calorimetry results of the duplicate samples for each of the two controls and the two lignin sulfonate samples are shown in Table 1.

TABLE 1

Calorimetry Results of Wood Pellets Containing Lignin Sulfonate

| Sample | Pellet HRRmax (mW/g) |
|---|---|
| Control 1 | 1.12 |
| Control 2 | 0.91 |
| Ammonium Lignosulfonate (0.7 wt-%) | 0.80 |
| Ammonium Lignosulfonate (1.3 wt-%) | 0.58 |

Figure 3:
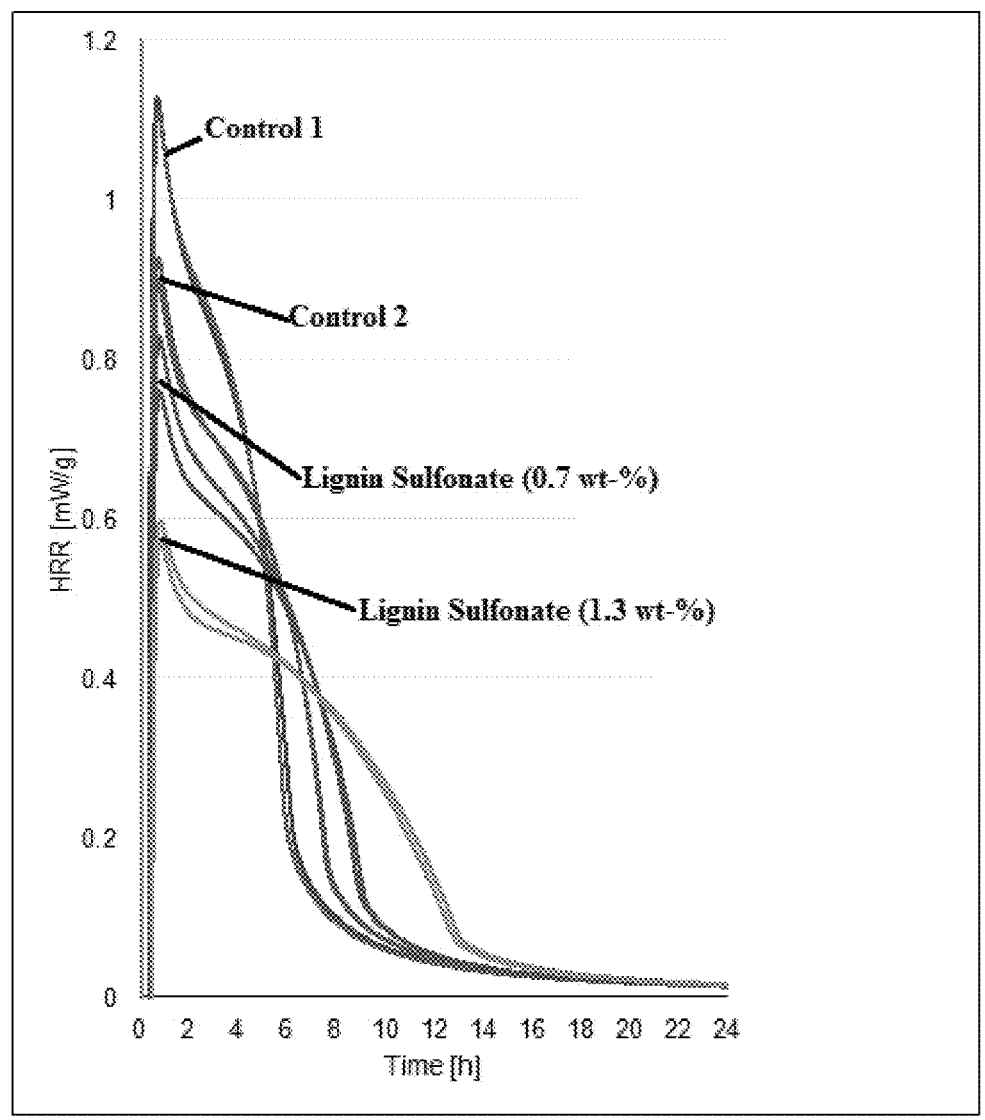
FIG. 3 is a graph illustrating calorimetry results of fuel pellets having the addition of lignin sulfonate according to certain aspects of the present invention compared to control fuel pellets.

The calorimetry results measuring HRR over time for the control and samples is illustrated in FIG. 3. The calorimetry results illustrate noticeable variations between fuel pellets treated with a source of lignin sulfonate compared to untreated fuel pellets.

Example 2

Wood Fuel Pellets Containing Non-Sulfonated Lignin

Woodmeal samples for each a medium reactivity wood (Loblolly Pine) and high reactivity wood (Southern Yellow Pine) were prepared by milling about 30 gram batches of wood pellets in an Ika M20 Universal Mill for about 30 seconds to produce a master batch. The resultant meal (wood fiber+dust) coming out of the mill was warm and allowed to cool to room temperature by spreading it in a thin layer across a sheet of foil and cooling for about 1 minute. The meal was then bagged and kept in cold storage prior to blending with the respective non-sulfonated lignin additive, which included softwood Kraft lignin, hardwood Kraft lignin, pyrolysis lignin and purified pyrolysis lignin.

The softwood Kraft lignin was obtained from precipitation of Kraft Black Liquor derived from Loblolly Pine, which in general comprised the process of acidification of the black liquor, followed by precipitation, filtration and drying. The softwood Kraft lignin analysis provided a weight average molecular weight (Mw) of about 10200; number average molecular weight (Mn) of about 800; total sulfur content of about 2.5% wt/wt; Ash content of about 2.1%; phenolic OH content of about 6.2% wt/wtl; and carboxyl content of about 0.5% wt/wt.

The hardwood Kraft lignin was obtained from precipitation of Kraft Black Liquor derived from the hardwood Eucalyptus, which in general comprised the process of acidification of the black liquor, followed by precipitation, filtration and drying. The hardwood Kraft lignin analysis provided a weight average molecular weight (Mw) of about 6800; number average molecular weight (Mn) of about 600; total sulfur content of about 2.1% wt/wt; Ash content of about 1.3%; phenolic OH content of about 5.9% wt/wt; and carboxyl content of about 0.4% wt/wt.

The pyrolysis lignin was obtained from Avello Corporation™ and was derived from the hardwood oak, which in general comprised the process of pyrolysis of hardwood chips, followed by recovery of the lignin fraction using Avello Corporation's fractionation process. The pyrolysis lignin analysis provided a weight average molecular weight (Mw) of about 2,700; number average molecular weight (Mn) of about 1,600; total sulfur content of about 0.0% wt/wt; Ash content of about 0.0%; phenolic OH content of about 4.7% wt/wt; and carboxyl content of about 0.16% wt/wt.

The pyrolysis lignin obtained from Avello Corporation was found to have a substantial portion of anhydrous sugars. These sugars were removed by standard liquid extraction techniques as follows: 1.00 liter 1-butanol was heated to 50° C. About 979.2 grams of the pyrolysis lignin was heated to 50° C. and added to the 1-butanol providing a total volume of about 1.8 liters. The pyrolysis lignin remained dissolved. The solution was extracted thrice with 2.00 liters of water. The first two water phases were the bottom phases, the third was a top phase, which indicated that less material was extracted into the last aliquot of water, so the density was lower. The water-saturated 1-butanol was mixed and evaporated to dryness under reduced pressure on a rotary evaporator (bath temperature 68° C.) to recover the purified pyrolysis lignin with a yield of 58.3%. The original pyrolysis lignin had a sticky, viscous state. The purified pyrolyisis lignin maintained a glassy state at ambient temperatures after the purification process.

The woodmeal was then blended with the various non-sulfonated lignin additives by mixing about 50 grams of woodmeal with calculated dosages of binder and supplemental water in the mill itself. About 2% dosages (wt %) of the respective non-sulfonated lignin additive was massed on a dry-matter basis inside the mill cup, which held an accurately massed quantity of woodmeal. This mixture was then milled for about 10 seconds. After the first stage of milling, a supplemental mass of water was then dosed into the mill cup on a pre-determined based to arrive at a moisture content target of about 8%, including the specific additive's moisture content. The newly wetted material was again milled for about 10 seconds to provide a blended sample, and then bagged. The blended sample bags were shaken vigorously and then kept in cold storage overnight with the intent to homogenize the moisture content of the blended sample bags. Prior to isothermal calorimetry analysis, the moisture content of each blended sample was manually checked using a moisture balance apparatus. The moisture content of all additives were also determined using the same moisture balance.

In testing the isothermal calorimetry of each woodmeal (Control) and woodmeal blend (Test Sample), an eight channel TAM Air 3116-2 isothermal calorimeter manufactured by TA Instruments, New Castle Del., USA was used. The isothermal calorimeter was used to accurately (mW-scale) measure the generated heat flow caused by the self-heating processes in the woodmeal blend. For each channel a glass test ampoule of 20 mL was used. For each test of the woodmeal and woodmeal blend sample, approximately 4.0 g was placed in the ampoule, which was then sealed with a Teflon coated septum and an aluminum crimp cap. For each test sample there is also an ampoule with an inert reference that does not produce any heat (e.g., water). When lowered into the instrument, the ampoules with the sample and reference are in contact with parallel heat flow sensors, which are also in contact with a heat sink. During the test, a temperature gradient is developed across the sensors. This temperature gradient is translated into the difference in heat release rate (HRR) between the sample and the reference, i.e. the rate of the process taking place in the sample ampoule.

The TAM Air instrument was used with the software "TAM Assistant v1.3.0.150", also supplied by TA Instruments, New Castle Del., USA. The heat flow measurements for the instrument were calibrated before testing, using the calibration procedures included in the software. Before each test was started, a 30 min baseline was measured when the instrument had reached stable/balanced conditions with no heat produced. The baseline was also measured after the test had been terminated, the samples removed from the instrument, and the instrument had reached stable conditions. The calorimetry results of six separate isothermal calorimetry tests for each woodmeal (Control) and each woodmeal blend (Test Sample) are shown in Table 3.

TABLE 2

Calorimetry Results of Wood Pellets Containing Non-Sulfonated Lignin

| Additive (wt %) | HRRmax of blended woodmeals (mW/g blend; avg +/− 95% CI) | |
| --- | --- | --- |
| | High Reactivity Wood | Medium Reactivity Wood |
| Control | 2.11 +/− 0.09 | 0.77 +/− 0.02 |
| 2% Softwood Kraft lignin | 1.80 +/− 0.10 | 0.72 +/− 0.02 |
| 2% Hardwood Kraft lignin | 1.77 +/− 0.09 | 0.67 +/− 0.02 |
| 2% Pyrolysis lignin | 1.00 +/− 0.04 | 0.57 +/− 0.02 |
| 1% SWKL + 1% HWKL† | — | 0.67 +/− 0.04 |

†The additive comprised 1 wt % of the softwood Kraft lignin and 1% of the hardwood Kraft lignin.

The calorimetry results illustrate noticeable variations between wood fuel pellets treated with a non-sulfonated lignin component compared to untreated wood fuel pellets.

Although specific embodiments have been illustrated and described herein for purposes of description of the preferred embodiments, it will be appreciated by those of ordinary skill in the art that a wide variety of alternate or equivalent implementations calculated to achieve the same purposes may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art.

Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method for manufacturing a fuel pellet having a reduced rate of self-heating reactivity, the method comprising:
    providing a fibrous wood material
    combining a lignin component additive with said fibrous wood material to form a mixture; and
    extruding said mixture under pressure through a pellet press to form a plurality of wood pellets having the lignin component additive in an amount of about 0.5 wt-% to about 5 wt-% on a dry basis;
    wherein the lignin component additive comprises hardwood Kraft lignin having a weight average molecular weight (Mw) between about 4000 and about 18,000, number average molecular weight (Mn) between about 400 and about 1000, total sulfur content between about 1 and about 4.5% wt/wt, Ash of about 1.0 to about 5.5%, phenolic OH content between about 3.0 and about 8.0% wt/wt, and carbonyl content between about 0.1 and about 2.0% wt/wt.

2. The method according to claim 1, wherein the fibrous wood material comprises torrefied wood, softwood, hardwood or combinations thereof.

3. The method according to claim 1, wherein the fibrous wood material comprises a softwood feedstock comprising cedar, cypress, douglas-fir, hemlock, larch, pine, and spruce, or combinations thereof.

4. The method according to claim 1, wherein the fibrous wood material comprises a hardwood feedstock comprising alder, ash, aspen, balsa, basswood, birch, boxelder, chestnut, cherry, cottonwood, dogwood, elm, hickory, ironwood, mahogany, maple, oak, poplar, sandalwood, walnut, willow, or combinations thereof.

5. The method according to claim 1, wherein the lignin component additive is added to the fibrous wood material as a liquid.

6. The method according to claim 1, wherein the lignin component additive is added to the fibrous wood material in a conditioning chamber prior to the pellet press.

7. The method according to claim 6, wherein the lignin component additive is added to the fibrous wood material in a conditioning chamber prior to the pellet press as a dry material.

8. The method according to claim 1, wherein the lignin component additive further comprises at least one lignin sulfonate, softwood Kraft lignin, pyrolysis lignin, purified pyrolysis lignin, or mixtures thereof.

9. The method according to claim 1, wherein the lignin component additive further comprises a lignin sulfonate that is a byproduct from the production of wood pulp using sulfite piping.

10. The method according to claim 1, wherein the lignin component additive further comprises a lignin sulfonate comprising one or more lignin sulfonate salts of calcium lignosulfonate, magnesium lignosulfonate, ammonium lignosulfonate and sodium lignosulfonate.

11. The method according to claim 1, wherein the lignin component additive further comprises softwood Kraft lignin having a weight average molecular weight (Mw) between about 6000 and about 25,000, number average molecular weight (Mn) between about 600 and about 1200, total sulfur content between about 1 and about 5% wt/wt, Ash of about 1.5 to about 6.0%, phenolic OH content between about 3.0 and about 8.0% wt/wt, and carbonyl content between about 0.1 and about 2.0% wt/wt.

12. The method according to claim 1, wherein the lignin component additive further comprises pyrolysis lignin having a weight average molecular weight (Mw) between about 1600 and about 4000, number average molecular weight (Mn) between about 400 and about 2000, total sulfur content of less than about 0.1% wt/wt, Ash of less than about 0.05%, phenolic OH content between about 4.0 and about 8.0% wt/wt, and carbonyl content between about 0.0 and 0.5% wt/wt.

13. The method according to claim 1, wherein the lignin component additive further comprises purified pyrolysis lignin.

14. The method according to claim 1, wherein the lignin component additive is present in an amount between about 0.6 wt-% and about 3.5 wt-%, based upon the total dry weight of the lignin component additive.

15. The method according to claim 1, wherein the lignin component additive is added to the fibrous wood material in a conditioning chamber prior to the pellet press, and wherein the feed mixture has a moisture content of about 6 to about 10 wt-% in the conditioning chamber.

16. The method according to claim 1, wherein the fuel pellets have a diameter of about 6 mm to about 1.5 inches and a length between about 1 centimeter and about 4 centimeters.

17. The method according to claim 1, wherein the lignin component additive is added to a organic fibrous hardwood material in an amount to effectively lower the potential reactivity of the wood pellets such that bulk wood pellets have an average maximum heat release rate below about 2.0 mW/g, as compared to fuel pellets from the same organic fibrous hardwood material without a non-sulfonated lignin component having an average maximum specific heat release rate greater than about 2.0 mW/g.

18. The method according to claim 1, wherein the lignin component additive is added to a organic fibrous softwood material in an amount to effectively lower the potential reactivity of the wood pellets such that bulk wood pellets have an average maximum heat release rate below about 0.75 mW/g, as compared to fuel pellets from the same organic fibrous hardwood material without a non-sulfonated lignin component having an average maximum specific heat release rate greater than about 0.75 mW/g.

19. The method according to claim 1, wherein the lignin component additive present in a plurality of fuel pellets in an amount between about 0.5 wt-% and about 5.0 wt based upon the total dry weight of the lignin component additive, lowers the potential reactivity of the plurality of fuel pellets by at least 10% up to about 50%, as compared to the same weight of a plurality of fuel pellets from the same organic fibrous wood material without the lignin additive component present.

20. A method for manufacturing a fuel pellet having a reduced rate of self-heating reactivity, the method comprising:
providing a fibrous wood material
combining a lignin component additive with said fibrous wood material to form a mixture; and
extruding said mixture under pressure through a pellet press to form a plurality of wood pellets having the lignin component additive in an amount of about 0.5 wt-% to about 5 wt-% on a dry basis;
wherein the lignin component additive comprises softwood Kraft lignin having a weight average molecular weight (Mw) between about 6000 and about 25,000, number average molecular weight (Mn) between about 600 and about 1200, total sulfur content between about 1 and about 5% wt/wt, Ash of about 1.5 to about 6.0%, phenolic OH content between about 3.0 and about 8.0% wt/wt, and carbonyl content between about 0.1 and about 2.0% wt/wt.

21. The method according to claim 20, wherein the fibrous wood material comprises torrefied wood, softwood, hardwood or combinations thereof.

22. The method according to claim 20, wherein the fibrous wood material comprises a softwood feedstock comprising cedar, cypress, douglas-fir, hemlock, larch, pine, and spruce, or combinations thereof.

23. The method according to claim 20, wherein the fibrous wood material comprises a hardwood feedstock comprising alder, ash, aspen, balsa, basswood, birch, boxelder, chestnut, cherry, cottonwood, dogwood, elm, hickory, ironwood, mahogany, maple, oak, poplar, sandalwood, walnut, willow, or combinations thereof.

24. The method according to claim 20, wherein the lignin component additive is added to the fibrous wood material as a liquid.

25. The method according to claim 20, wherein the lignin component additive is added to the fibrous wood material in a conditioning chamber prior to the pellet press.

26. The method according to claim 25, wherein the lignin component additive is added to the fibrous wood material in a conditioning chamber prior to the pellet press as a dry material.

27. The method according to claim 20, wherein the lignin component additive further comprises at least one lignin sulfonate, hardwood Kraft lignin, pyrolysis lignin, purified pyrolysis lignin, or mixtures thereof.

28. The method according to claim 20, wherein the lignin component additive further comprises a lignin sulfonate that is a byproduct from the production of wood pulp using sulfite piping.

29. The method according to claim 20, wherein the lignin component additive further comprises a lignin sulfonate comprising one or more lignin sulfonate salts of calcium lignosulfonate, magnesium lignosulfonate, ammonium lignosulfonate and sodium lignosulfonate.

30. The method according to claim 20, wherein the lignin component additive further comprises hardwood Kraft lignin having a weight average molecular weight (Mw) between about 4000 and about 18,000, number average molecular weight (Mn) between about 400 and about 1000, total sulfur content between about 1 and about 4.5% wt/wt, Ash of about 1.0 to about 5.5%, phenolic OH content between about 3.0 and about 8.0% wt/wt, and carbonyl content between about 0.1 and about 2.0% wt/wt.

31. The method according to claim 20, wherein the lignin component additive further comprises pyrolysis lignin having a weight average molecular weight (Mw) between about 1600 and about 4000, number average molecular weight (Mn) between about 400 and about 2000, total sulfur content of less than about 0.1% wt/wt, Ash of less than about 0.05%, phenolic OH content between about 4.0 and about 8.0% wt/wt, and carbonyl content between about 0.0 and 0.5% wt/wt.

32. The method according to claim 20, wherein the lignin component additive further comprises purified pyrolysis lignin.

33. The method according to claim 20, wherein the lignin component additive is present in an amount between about 0.6 wt-% and about 3.5 wt-%, based upon the total dry weight of the lignin component additive.

34. The method according to claim 20, wherein the lignin component additive is added to the fibrous wood material in a conditioning chamber prior to the pellet press, and wherein the feed mixture has a moisture content of about 6 to about 10 wt-% in the conditioning chamber.

35. The method according to claim 20, wherein the fuel pellets have a diameter of about 6 mm to about 1.5 inches and a length between about 1 centimeter and about 4 centimeters.

36. The method according to claim 20, wherein the lignin component additive is added to a organic fibrous hardwood material in an amount to effectively lower the potential reactivity of the wood pellets such that bulk wood pellets have an average maximum heat release rate below about 2.0 mW/g, as compared to fuel pellets from the same organic fibrous hardwood material without a non-sulfonated lignin component having an average maximum specific heat release rate greater than about 2.0 mW/g.

37. The method according to claim 20, wherein the lignin component additive is added to a organic fibrous softwood material in an amount to effectively lower the potential reactivity of the wood pellets such that bulk wood pellets have an average maximum heat release rate below about 0.75 mW/g, as compared to fuel pellets from the same organic fibrous hardwood material without a non-sulfonated lignin component having an average maximum specific heat release rate greater than about 0.75 mW/g.

38. The method according to claim 20, wherein the lignin component additive present in a plurality of fuel pellets in an amount between about 0.5 wt-% and about 5.0 wt based upon the total dry weight of the lignin component additive, lowers the potential reactivity of the plurality of fuel pellets by at least 10% up to about 50%, as compared to the same weight of a plurality of fuel pellets from the same organic fibrous wood material without the lignin additive component present.

39. A method for manufacturing a fuel pellet having a reduced rate of self-heating reactivity, the method comprising:
providing a fibrous wood material
combining a lignin component additive with said fibrous wood material to form a mixture; and
extruding said mixture under pressure through a pellet press to form a plurality of wood pellets having the lignin component additive in an amount of about 0.5 wt-% to about 5 wt-% on a dry basis;
wherein the lignin component additive comprises pyrolysis lignin having a weight average molecular weight (Mw) between about 1600 and about 4000, number average molecular weight (Mn) between about 400 and about 2000, total sulfur content of less than about 0.1% wt/wt, Ash of less than about 0.05%, phenolic OH content between about 4.0 and about 8.0% wt/wt, and carbonyl content between about 0.0 and 0.5% wt/wt.

40. The method according to claim 39, wherein the fibrous wood material comprises torrefied wood, softwood, hardwood or combinations thereof.

41. The method according to claim 39, wherein the fibrous wood material comprises a softwood feedstock comprising cedar, cypress, douglas-fir, hemlock, larch, pine, and spruce, or combinations thereof.

42. The method according to claim 39, wherein the fibrous wood material comprises a hardwood feedstock comprising alder, ash, aspen, balsa, basswood, birch, boxelder, chestnut, cherry, cottonwood, dogwood, elm, hickory, ironwood, mahogany, maple, oak, poplar, sandalwood, walnut, willow, or combinations thereof.

43. The method according to claim 39, wherein the lignin component additive is added to the fibrous wood material as a liquid.

44. The method according to claim 39, wherein the lignin component additive is added to the fibrous wood material in a conditioning chamber prior to the pellet press.

45. The method according to claim 44, wherein the lignin component additive is added to the fibrous wood material in a conditioning chamber prior to the pellet press as a dry material.

46. The method according to claim 39, wherein the lignin component additive further comprises at least one lignin sulfonate, softwood Kraft lignin, hardwood Kraft lignin, purified pyrolysis lignin, or mixtures thereof.

47. The method according to claim 39, wherein the lignin component additive further comprises a lignin sulfonate that is a byproduct from the production of wood pulp using sulfite piping.

48. The method according to claim 39, wherein the lignin component additive further comprises a lignin sulfonate comprising one or more lignin sulfonate salts of calcium lignosulfonate, magnesium lignosulfonate, ammonium lignosulfonate and sodium lignosulfonate.

49. The method according to claim 39, wherein the lignin component additive further comprises softwood Kraft lignin having a weight average molecular weight (Mw) between about 6000 and about 25,000, number average molecular weight (Mn) between about 600 and about 1200, total sulfur content between about 1 and about 5% wt/wt, Ash of about 1.5 to about 6.0%, phenolic OH content between about 3.0 and about 8.0% wt/wt, and carbonyl content between about 0.1 and about 2.0% wt/wt.

50. The method according to claim 39, wherein the lignin component additive further comprises hardwood Kraft lignin having a weight average molecular weight (Mw) between about 4000 and about 18,000, number average molecular weight (Mn) between about 400 and about 1000, total sulfur content between about 1 and about 4.5% wt/wt, Ash of about 1.0 to about 5.5%, phenolic OH content between about 3.0 and about 8.0% wt/wt, and carbonyl content between about 0.1 and about 2.0% wt/wt.

51. The method according to claim 39, wherein the lignin component additive further comprises purified pyrolysis lignin.

52. The method according to claim 39, wherein the lignin component additive is present in an amount between about 0.6 wt-% and about 3.5 wt-%, based upon the total dry weight of the lignin component additive.

53. The method according to claim 39, wherein the lignin component additive is added to the fibrous wood material in a conditioning chamber prior to the pellet press, and wherein the feed mixture has a moisture content of about 6 to about 10 wt-% in the conditioning chamber.

54. The method according to claim 39, wherein the fuel pellets have a diameter of about 6 mm to about 1.5 inches and a length between about 1 centimeter and about 4 centimeters.

55. The method according to claim 39, wherein the lignin component additive is added to a organic fibrous hardwood material in an amount to effectively lower the potential reactivity of the wood pellets such that bulk wood pellets have an average maximum heat release rate below about 2.0 mW/g, as compared to fuel pellets from the same organic fibrous hardwood material without a non-sulfonated lignin component having an average maximum specific heat release rate greater than about 2.0 mW/g.

56. The method according to claim 39, wherein the lignin component additive is added to a organic fibrous softwood material in an amount to effectively lower the potential reactivity of the wood pellets such that bulk wood pellets have an average maximum heat release rate below about 0.75 mW/g, as compared to fuel pellets from the same organic fibrous hardwood material without a non-sulfonated lignin component having an average maximum specific heat release rate greater than about 0.75 mW/g.

57. The method according to claim 39, wherein the lignin component additive present in a plurality of fuel pellets in an amount between about 0.5 wt-% and about 5.0 wt based upon the total dry weight of the lignin component additive, lowers the potential reactivity of the plurality of fuel pellets by at least 10% up to about 50%, as compared to the same weight of a plurality of fuel pellets from the same organic fibrous wood material without the lignin additive component present.

58. A method for manufacturing a fuel pellet having a reduced rate of self-heating reactivity, the method comprising:
providing a fibrous wood material
combining a lignin component additive with said fibrous wood material to form a mixture; and
extruding said mixture under pressure through a pellet press to form a plurality of wood pellets having the lignin component additive in an amount of about 0.5 wt-% to about 5 wt-% on a dry basis;
wherein the lignin component additive comprises purified pyrolysis lignin.

59. The method according to claim 58, wherein the fibrous wood material comprises torrefied wood, softwood, hardwood or combinations thereof.

60. The method according to claim 58, wherein the fibrous wood material comprises a softwood feedstock comprising cedar, cypress, douglas-fir, hemlock, larch, pine, and spruce, or combinations thereof.

61. The method according to claim 58, wherein the fibrous wood material comprises a hardwood feedstock comprising alder, ash, aspen, balsa, basswood, birch, boxelder, chestnut, cherry, cottonwood, dogwood, elm, hickory, ironwood, mahogany, maple, oak, poplar, sandalwood, walnut, willow, or combinations thereof.

62. The method according to claim 58, wherein the lignin component additive is added to the fibrous wood material as a liquid.

63. The method according to claim 58, wherein the lignin component additive is added to the fibrous wood material in a conditioning chamber prior to the pellet press.

64. The method according to claim 63, wherein the lignin component additive is added to the fibrous wood material in a conditioning chamber prior to the pellet press as a dry material.

65. The method according to claim 58, wherein the lignin component additive further comprises at least one lignin sulfonate, softwood Kraft lignin, hardwood Kraft lignin, pyrolysis lignin, or mixtures thereof.

66. The method according to claim 58, wherein the lignin component additive further comprises a lignin sulfonate that is a byproduct from the production of wood pulp using sulfite piping.

67. The method according to claim 58, wherein the lignin component additive further comprises a lignin sulfonate comprising one or more lignin sulfonate salts of calcium lignosulfonate, magnesium lignosulfonate, ammonium lignosulfonate and sodium lignosulfonate.

68. The method according to claim 58, wherein the lignin component additive further comprises softwood Kraft lignin having a weight average molecular weight (Mw) between about 6000 and about 25,000, number average molecular weight (Mn) between about 600 and about 1200, total sulfur content between about 1 and about 5% wt/wt, Ash of about 1.5 to about 6.0%, phenolic OH content between about 3.0 and about 8.0% wt/wt, and carbonyl content between about 0.1 and about 2.0% wt/wt.

69. The method according to claim 58, wherein the lignin component additive further comprises hardwood Kraft lignin having a weight average molecular weight (Mw) between about 4000 and about 18,000, number average molecular weight (Mn) between about 400 and about 1000, total sulfur content between about 1 and about 4.5% wt/wt, Ash of about 1.0 to about 5.5%, phenolic OH content between about 3.0 and about 8.0% wt/wt, and carbonyl content between about 0.1 and about 2.0% wt/wt.

70. The method according to claim 58, wherein the lignin component additive further comprises pyrolysis lignin having a weight average molecular weight (Mw) between about 1600 and about 4000, number average molecular weight (Mn) between about 400 and about 2000, total sulfur content of less than about 0.1% wt/wt, Ash of less than about 0.05%, phenolic OH content between about 4.0 and about 8.0% wt/wt, and carbonyl content between about 0.0 and 0.5% wt/wt.

71. The method according to claim 58, wherein the lignin component additive is present in an amount between about 0.6 wt-% and about 3.5 wt-%, based upon the total dry weight of the lignin component additive.

72. The method according to claim 58, wherein the lignin component additive is added to the fibrous wood material in a conditioning chamber prior to the pellet press, and wherein the feed mixture has a moisture content of about 6 to about 10 wt-% in the conditioning chamber.

73. The method according to claim 58, wherein the fuel pellets have a diameter of about 6 mm to about 1.5 inches and a length between about 1 centimeter and about 4 centimeters.

74. The method according to claim 58, wherein the lignin component additive is added to a organic fibrous hardwood material in an amount to effectively lower the potential reactivity of the wood pellets such that bulk wood pellets have an average maximum heat release rate below about 2.0 mW/g, as compared to fuel pellets from the same organic fibrous hardwood material without a non-sulfonated lignin component having an average maximum specific heat release rate greater than about 2.0 mW/g.

75. The method according to claim 58, wherein the lignin component additive is added to a organic fibrous softwood material in an amount to effectively lower the potential reactivity of the wood pellets such that bulk wood pellets have an average maximum heat release rate below about 0.75 mW/g, as compared to fuel pellets from the same organic fibrous hardwood material without a non-sulfonated lignin component having an average maximum specific heat release rate greater than about 0.75 mW/g.

76. The method according to claim 58, wherein the lignin component additive present in a plurality of fuel pellets in an amount between about 0.5 wt-% and about 5.0 wt based upon the total dry weight of the lignin component additive, lowers the potential reactivity of the plurality of fuel pellets by at least 10% up to about 50%, as compared to the same weight of a plurality of fuel pellets from the same organic fibrous wood material without the lignin additive component present.

* * * * *